(12) United States Patent  
Großmann

(10) Patent No.: US 8,077,195 B2
(45) Date of Patent: Dec. 13, 2011

(54) AUTOSTEREOSCOPIC SYSTEM

(75) Inventor: Christoph Großmann, Hamburg (DE)

(73) Assignee: SeeFront GmbH, Hamburg (DE)

( * ) Notice: Subject to any disclaimer, the term of this patent is extended or adjusted under 35 U.S.C. 154(b) by 440 days.

(21) Appl. No.: 11/575,997

(22) PCT Filed: Jul. 24, 2006

(86) PCT No.: PCT/EP2006/007267
§ 371 (c)(1),
(2), (4) Date: Mar. 26, 2007

(87) PCT Pub. No.: WO2008/011888
PCT Pub. Date: Jan. 31, 2008

(65) Prior Publication Data
US 2009/0201363 A1    Aug. 13, 2009

(51) Int. Cl.
*H04N 13/04*    (2006.01)
(52) U.S. Cl. .................. 348/51; 348/43; 348/46; 345/7; 345/32; 349/15; 349/74
(58) Field of Classification Search .............. 348/46, 348/51; 345/7, 32; 349/15, 74; 709/43, 709/46, 51
See application file for complete search history.

(56) References Cited

U.S. PATENT DOCUMENTS

| | | | | |
|---|---|---|---|---|
| 4,829,365 A | * | 5/1989 | Eichenlaub | 348/54 |
| 5,833,507 A | * | 11/1998 | Woodgate et al. | 445/24 |
| 5,917,562 A | * | 6/1999 | Woodgate et al. | 349/15 |
| 5,959,664 A | * | 9/1999 | Woodgate | 348/59 |
| 5,966,167 A | | 10/1999 | Nose et al. | |
| 6,157,402 A | * | 12/2000 | Torgeson | 348/59 |
| 6,157,424 A | * | 12/2000 | Eichenlaub | 349/74 |
| 6,359,664 B1 | * | 3/2002 | Faris | 349/15 |
| 6,703,989 B1 | * | 3/2004 | Harrold et al. | 345/32 |
| 6,876,495 B2 | * | 4/2005 | Street | 359/622 |
| 7,239,293 B2 | * | 7/2007 | Perlin et al. | 345/7 |
| 7,450,188 B2 | * | 11/2008 | Schwerdtner | 349/15 |

(Continued)

FOREIGN PATENT DOCUMENTS

EP    0969418 A2    1/2000

(Continued)

OTHER PUBLICATIONS

Pastoor, S. et al, 17-D: Invited Paper: Autostereoscopic User-Computer Interface with Visually Controlled Interactions, 1997 SID International Symposium Digest of Technical Papers, Boston, MA, May 13-15, 1997, SID International Symposium Digest of Technical Papers, Santa Ana, CA, US, vol. 28, May 13, 1997, pp. 277-280.

(Continued)

*Primary Examiner* — Michael Won
(74) *Attorney, Agent, or Firm* — Richard M. Goldberg

(57) ABSTRACT

A method for the autostereoscopic representation of images on a screen, wherein image information of separate channels for a right eye and a left eye of a user is displayed in interleaved segments on the screen, and a lens array is disposed for deflecting light emitted from the screen such that the image information of each channel is visible only for one eye of the user, including the steps of defining a channel mask, as determined by the lens array, projecting the channel mask onto the screen, thereby to assign to each pixel of the screen a correlation with at least one of the channels, storing, for each channel, and determining the contents of each pixel on the basis of its correlations with the channels.

18 Claims, 15 Drawing Sheets

U.S. PATENT DOCUMENTS

| | | | |
|---|---|---|---|
| 7,466,336 B2 * | 12/2008 | Regan et al. | 348/50 |
| 7,616,227 B2 * | 11/2009 | Lipton et al. | 348/51 |
| 2003/0012425 A1 | 1/2003 | Suzuki et al. | |
| 2003/0098907 A1 * | 5/2003 | Naske | 348/42 |
| 2008/0212153 A1 * | 9/2008 | Haussler et al. | 359/32 |

FOREIGN PATENT DOCUMENTS

| | | |
|---|---|---|
| WO | 97/47142 A2 | 12/1997 |
| WO | 98/53616 A1 | 11/1998 |
| WO | 01/62014 A2 | 8/2001 |
| WO | 01/84852 A1 | 11/2001 |

OTHER PUBLICATIONS

Omura, K. et al, Society for Information Display: Lenticular Stereoscopic Display System with Eye-Position Tracking and without Special-Equipment Needs, SID International Symposium Digest of Technical Papers, San Jose, CA, Jun. 14-16, 1994, Santa Ana, CA, U.S., vol. 25, Jun. 14, 1994, pp. 187-190.

Tetsutani, N. et al, Stereoscopic Display Method Employing Eye-Position Tracking and HDTV LCD-Projector, Signal Processing of HDTV, Proceedings of the International Workshop on HDTV, Nov. 18, 1992, pp. 473-480.

* cited by examiner

AUTOSTEREOSCOPIC SYSTEM

BACKGROUND OF THE INVENTION

The invention relates to a method for the autostereoscopic representation of images on a screen, wherein image information of separate channels for a right eye and a left eye of a user is displayed in interleaved segments on the screen, and a lens array is disposed for deflecting light emitted from the screen such that the image information of each channel is visible only for one eye of the user.

According to the general principles of stereoscopy, an impression of spatial depth is generated by presenting to the two eyes of a viewer two different images that show the same scene from slightly different perspectives which reflect in the parallax difference between the left and right eye of the viewer.

Conventional systems for presenting different images to the left and right eyes of the user employ headsets or shutter glasses which, however, are quite disturbing for the user.

U.S. Pat. No. 6,302,541 A1 describes a method of the type indicated above, which permits to view autostereoscopic images "with the naked eye", so that stereoscopic images can for example be produced on a screen of a computer monitor or the like. To that end, the image information of the left and right channels, i.e. the information intended for the left and right eye, respectively, of the user, is displayed on the screen in the form of segments, i.e. vertical stripes, which alternatingly belong to the left and to the right channel, and a lens array formed for example by cylindrical lenses is arranged in front of the screen and is carefully positioned relative to the pixel raster of the screen, so that the light emitted from the various screen pixels is deflected such that, for a specific position of the viewer, the information of each channel is visible only for one eye. A head tracking or eye tracking system may be employed for adapting the image representation on the screen to changing positions of the viewer.

This method has the further remarkable feature that each segment includes, in addition to image information that is assigned to that segment, also image information that is assigned to at least one adjacent segment of the same channel. It is therefore quite robust against minor variations in the position of the user, if no head or eye tracking system is used, and is also robust against delays in the head tracking system. This robustness is achieved by a redundancy in the information displayed in each segment, so that, when the viewing position is changed and, as a result, other pixels become visible for each eye of the user, the information displayed in the pixels that have become visible still fits into the image for the pertinent channel.

SUMMARY OF THE INVENTION

It is an object of the invention to provide an autostereoscopic method and system which provide more flexibility in implementing the method with different hardware equipment.

In order to achieve this object, the method of the type indicated above is characterised by the steps of:
defining a channel mask, as determined by the lens array, in a display coordinate system that has a fixed relationship to the lens array,
subjecting the channel mask to a coordinate transformation that corresponds to a projection of the channel mask from a principal plane of the lens array onto an object plane of the screen, with a position of the user as projection centre, thereby to assign to each pixel of the screen a correlation with at least one of the channels,
storing, for each channel, a texture map containing the image information of that channel,
performing a coordinate transformation that associates each pixel of the screen with an area in at least one of the texture maps, said transformation representing the deflection of light from the pixel by the lens array,
and determining the contents of each pixel on the basis of its correlations with the texture maps and the contents of the associated areas of these texture maps.

It is a main advantage of this method that it imposes less strict requirements on the positional relationship between the lens array and the pixel raster on the screen. To that end, the configuration of the lens array is modelled by a channel mask in the software of the system, and this mask is then projected onto the object plane on the screen, by means of a central projection with the position of the viewer as the projection centre. Then, by relating the pixels on the screen to the projected image of the channel mask, it is possible to determine for each pixel the channel to which it belongs. In this way, it is no longer necessary to have a fixed relationship between the cylindrical lenses of the lens array and the pixels that are visible through each of these lenses. Thus, the lens array and the pixel raster of the screen are uncoupled, which has the great advantage that the design of the lens array does not have to be adapted to the pixel raster on the screen, and a given lens array can be used with the large variety of screens with different resolutions and pixel rasters. As a result, anyone who has a computer with a monitor screen can utilise the invention just by attaching a lens array to his screen and making a few adaptions, in particular for defining the channel mask, in the software of the system. Further, the pixel resolution of the screen can be increased and/or the lens size of the lens array can be reduced without increasing the risk of mismatch errors.

In the method according to the invention, once it has been decided to which channel a pixel belongs, the contents to be displayed in that pixel are fetched from a texture map that is associated with the pertinent channel. The texture map may be thought of as a bitmap that includes the complete image to be displayed to one eye of the user. However, the resolution and the aspect ratio of the texture map need not be identical with the resolution and aspect ratio of the screen, which contributes to the portability of the software. The portion of the texture map that defines the contents of the pixel is determined in accordance with the optical properties of the lens array, so that the contents of the pixel correspond to the image information at the position where the user sees this pixel through the lens array. This position and hence the pertinent location in the texture map is calculated by means of a coordinate transformation the parameters of which depend on the lens array that is being employed. Thus, the software can easily be adapted to different lens arrays by appropriately adjusting these parameters.

It will accordingly be understood that the method according to the invention can flexibly be adapted to the available hardware. Moreover, since there is no strict coupling between the properties of the screen and those of the lens array, many of the effects that degrade the quality of the three dimensional images and result from a mismatch between the lens array and the screen can be eliminated.

A system and a software product adapted to carry out the method according to the invention are defined in the independent product claims.

More specific features of preferred embodiments of the invention are indicated in the dependent claims.

The method according to the invention has sufficient flexibility to be adapted to a system in which the cylinder lenses of the lens array are inclined relative to the pixel columns on the screen. Such a system constitutes a preferred embodiment of the invention, because, as is well known in the art, an inclination of the lens array helps to mitigate Moiré effects and other errors, such as colour seams, that are related to transitions between adjacent lenses. The coordinate transformation reflecting the imaging properties of the lens array will then be a so-called axially affine transformation which has an invariant axis corresponding to the central axis of the cylindrical lens.

An individual pixel on the screen is not necessarily assigned to just one of the two channels, but may be correlated with both channels. This will be the case when the pixel is located on the borderline between two channels. In that case, in order to mitigate transition errors, it is preferable to apply a filtering procedure which blends the contents of the two texture maps in accordance with the correlations of the pixel with the two channels.

In a colour display, wherein each pixel is composed of three sub-pixels, the correlations with the two channels may be different for different sub-pixels of the same pixel. If the pixels on the channel border are visible in at least one of the two channels, these different correlations of the sub-pixels may give rise to colour errors, which will however largely be mitigated when the lens array is inclined. In order to further suppress such errors, it is possible to redefine the pixel as a different triplet of sub-pixels which will then all have approximately the same correlations with the pertinent channel. Other possibilities are algorithms for "diffusing" the colour error onto neighbouring pixels.

The coordinate transformations involved in both, the projection of the channel mask and the identification of the contents of the pixel can easily be described as matrices, and two transformations performed one after the other will then be described by the product of the two matrices. Similarly, the inverse of a transformation will be described by the inverted matrix, and applying a coordinate transformation to a geometric object corresponds to a multiplication of the corresponding matrix with one or more vectors defining the object. The coordinate transformation may also include displacements, but may nevertheless be described by matrices, i.e., by so-called homogenised matrices, which, for a transformation in a three dimensional space, are specific 4×4 matrices, wherein the matrix elements in the fourth line specify the translation. The advantage of describing the coordinate transformations as matrix multiplications is that state of the art graphic cards or graphic accelerators are particularly strong in performing such matrix multiplications very efficiently.

If the position of the user is allowed to vary, for example, when a head tracking or eye tracking system is employed, those of the coordinate transformations which depend upon the position of the user will be represented by time-dependent matrices. Then, it is possible and preferable to represent the coordinate transformations by a product of a constant matrix with a time dependent matrix summarising all transformations that are dependent on the position of the user. Then, only the time dependent matrix has to be adapted dynamically, and the complete transformation is obtained simply by multiplying this matrix with the constant matrix which needs to be calculated only once.

The procedures involved in fetching the contents of a pixel from the texture masks also rely upon the particular strength and capabilities of modern graphic processing hardware and may involve techniques that are known as "mapping of textures onto geometries" or "rendering pipelines" and may be based on graphic interfaces such as OpenGL or DirectX, for example.

Preferred embodiments of the invention will now be described in conjunction with the drawings, wherein:

DETAILED DESCRIPTION

Figure 1:
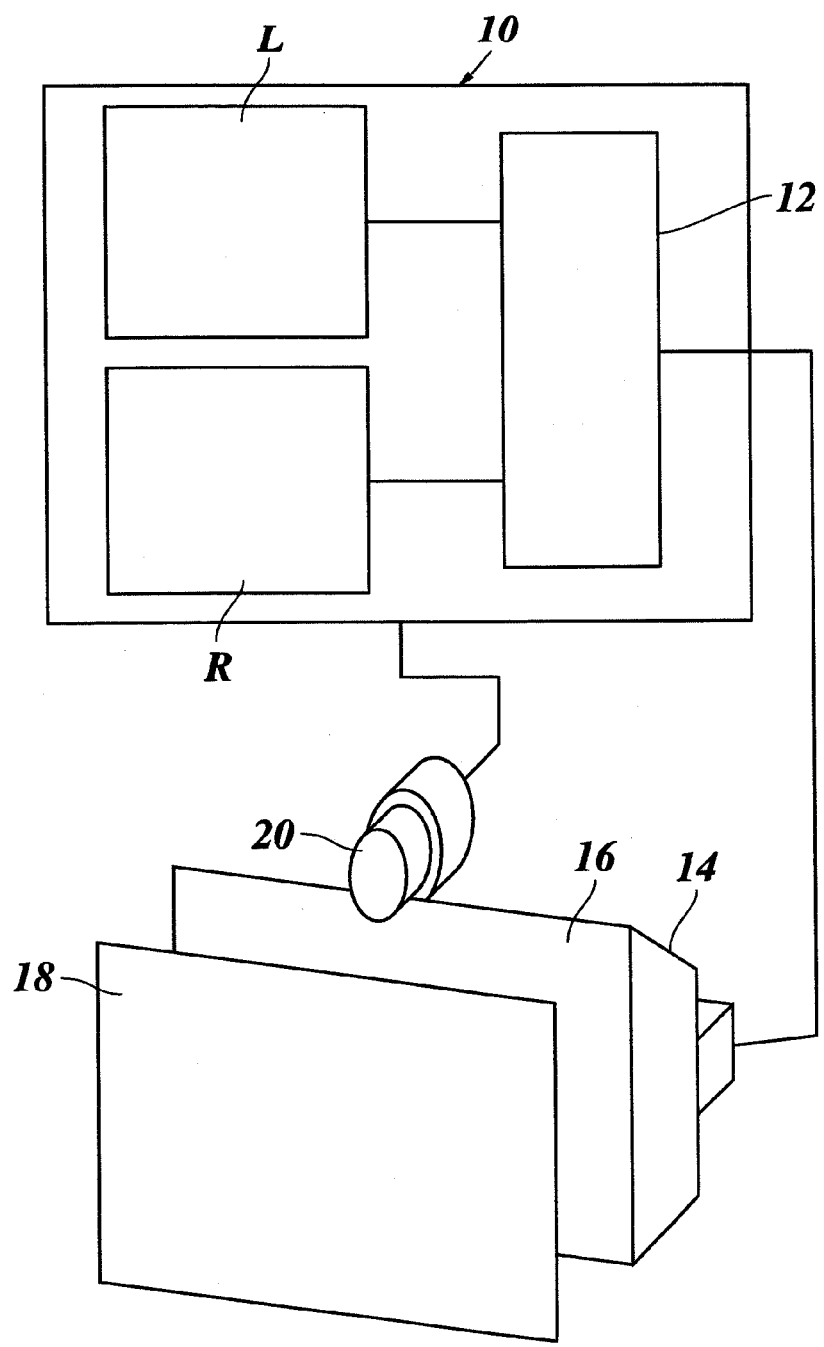
FIG. 1 is a block diagram of a system according to the invention.

The system shown in FIG. 1 comprises a computer system 10, e.g. a personal computer, including a graphics card 12 which drives a monitor 14 so as to display images on the screen 16 of the monitor. A lens array 18 is disposed in front of the screen 16, and a video camera forming part of an eye tracking or head tracking system 20 is attached to the monitor 14 and communicates with the computer system 10.

The graphics card 12 has access to two texture maps L and R that are stored in a memory of the computer system 10. The texture map L stores image information of a left channel, i.e. image information that is to be displayed to the left eye of a user (not shown) who looks at the screen 16 through the lens array 18. Similarly, the texture map R stores image information of the right channel for the right eye of the user. The head tracking system 20 keeps track of any movements of the head of the user and signals these movements to the computer system, which will then adapt the information displayed on the screen 16 to the changed position of the user.

Figure 2:
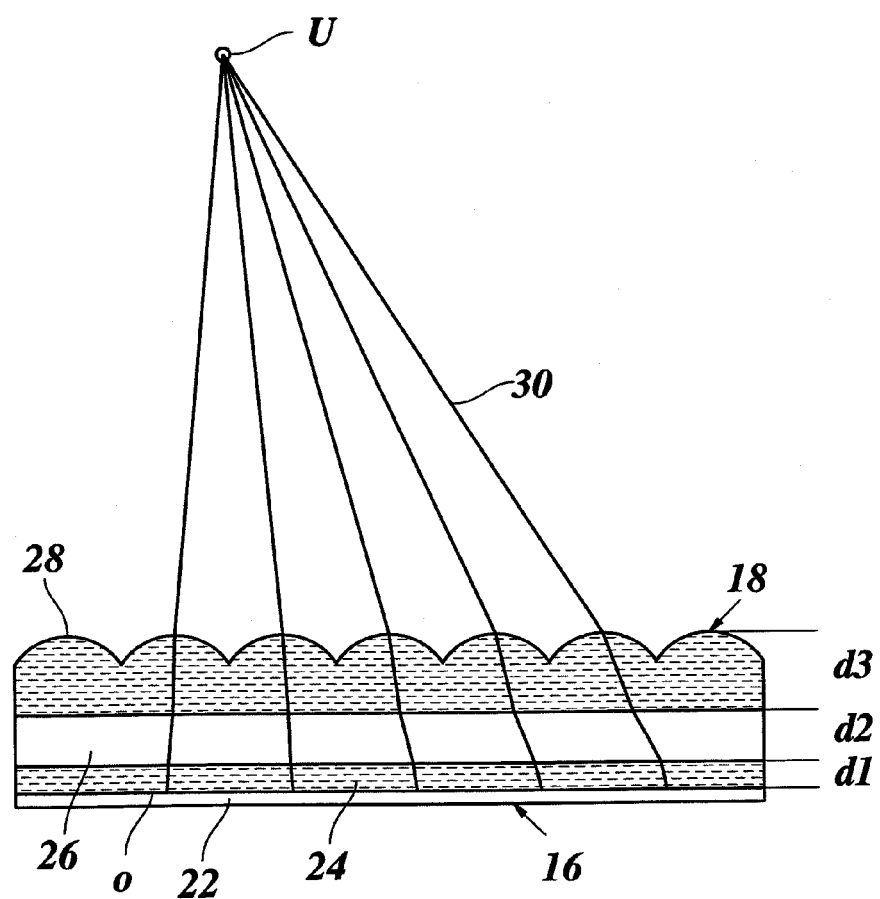
FIG. 2 is a cross-sectional view of a lens array, illustrating the light deflecting properties thereof.

FIG. 2 is a schematic cross-sectional view of the screen 16 and the lens array 18. The screen 16 may for example be a TFT screen comprising a TFT layer 22 that is protected by a flexible cover 24 with a thickness d1. The lens array 18 is separated from the cover 24 by an air gap 26 with a thickness d2 and is formed by a transparent plate having a plane back surface and a corrugated front surface defining an array of parallel cylindrical lenses 28. The plate forming the lens array 18 has an overall thickness d3, measured at the apex of the cylindrical lenses 28.

A number of rays 30 symbolise light rays that are emitted from various TFTs in the TFT layer 22 and are refracted at the transparent cover 24 and the lens array 18 before they finally meet in a point U which symbolises an idealised position of a user or viewer who looks at the screen. Each of the rays 30 passes through an apex of one of the lenses 28. Thus, the points from which the rays 30 originate in the plane of the TFT layer 22, the object plane o, may be considered as the projections of the apex lines of the cylindrical lenses 28 when illuminated from a source located at the point U.

Figure 3:
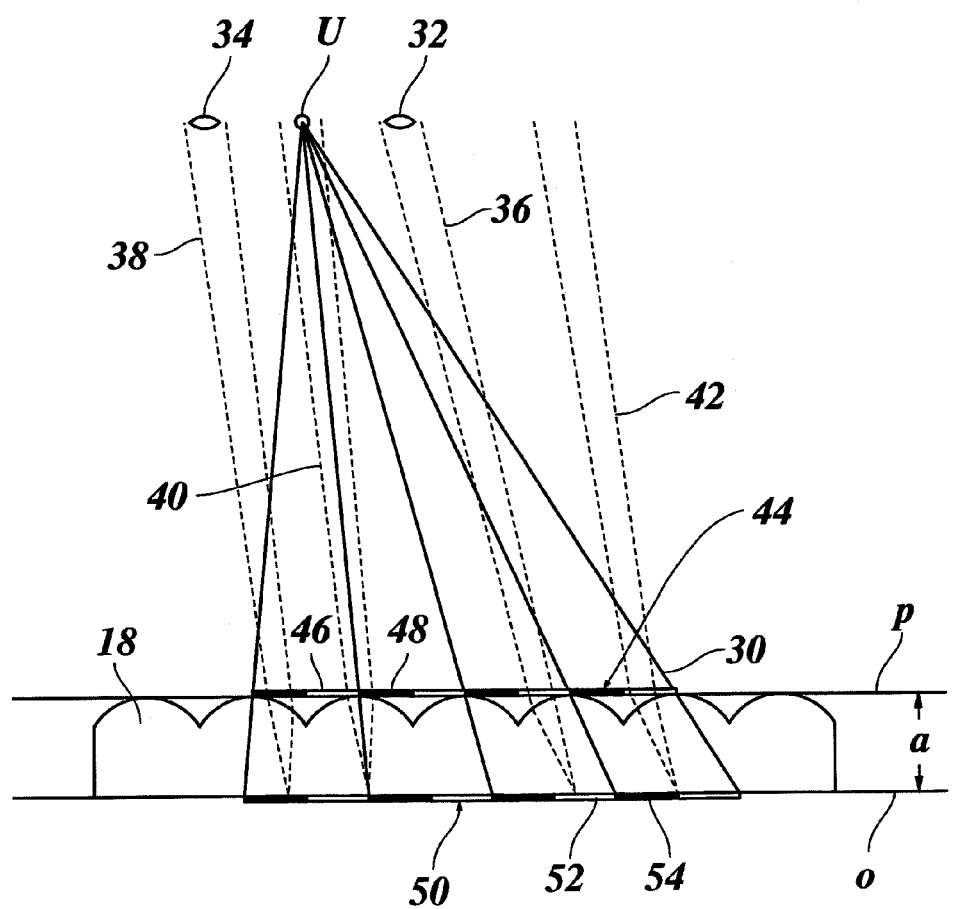
FIG. 3 is a diagram illustrating the light deflection properties of the lens array in a manner equivalent to that in FIG. 2.

FIG. 3 shows simplified but equivalent diagram, wherein the different refractive indices n1, n2 and n3 of the cover 24, the air gap 26 and the lens array 18, respectively, have been neglected, and, instead, the object plane o has been moved closer to the lens array 18, so that the rays 30, which are now straight, hit the object plane o in exactly in the same positions as in FIG. 2. The equivalent diagram shown in FIG. 3 is a good approximation to the real situation, if one neglects the effect of the field curvature of the cylindrical lenses. It should be observed in this context that, in practise, the distance between the point U, i.e. the position of the user, and the screen will be much larger than in FIG. 2 or 3, so that the effect of the field curvature will not be as pronounced as might be expected from FIGS. 2 and 3.

A plane p passing through the apex lines of each of the cylindrical lenses will be termed the principal plane of the lens array. The (fictitious) object distance a between the object plane o and the principal plane p is related to the refractive indices and thicknesses of the cover 24, the air gap 26 and the lens array 28 by:

$$a = d1/n1 + d2/n2 + d3/n3.$$

FIG. 3 also shows the left and right eyes 32, 34 of the user and shows that the point U which indicates the idealised position of the user is defined as the point on the centre of the line connecting the eyes 32 and 34. Further, FIG. 3 shows several light beams 36, 38, 40, 42, which are emitted in the object plane o (corresponding to the plane of the TFTs), are deflected by the lenses of the lens array 18 and then propagate towards the eyes 32, 34 of the user or past the same. While the rays 30 are not deflected at the lenses, because they pass through the centres of the lenses, the beams 36-42 are deflected (and also condensed) at the curved surfaces of the cylindrical lenses. The beam 36 is so deflected, that it hits the left eye 32 of the user. Similarly, the beam 38 is so deflected that it hits the right eye 34 of the user. In contrast, the beam 40 passes through the centre of its associated lens and is therefore not deflected but only condensed and hits the point U right between the eyes of the user. Thus, this beam, and the associated pixel on the screen, are not visible for the user. Similarly, the beam 42 is deflected so strongly, that it passes by the left eye of the user, so that this beam and the associated pixel are not visible for the user, neither. It will thus be understood that the image displayed in the object plane o is subdivided into stripes or segments that are visible only for the left eye 32 of the user, alternating with segments that are visible only for the right eye 34 of the user, and these segments will normally be separated by "invisibility zones" that are not visible at all. In particular, the zone corresponding to the beam 40 separates a segment associated with the left eye 32, and hence the left channel of the image information, from a segment associated with the right eye 34 and the right channel.

This property of the lens array 18 is represented by a channel mask 44 which divides the principal plane p into left channel zones 46 (shown in white in FIG. 3) and right channel zones 48 (shown in black). The apex lines of the cylindrical lenses form first-type transitions from a left channel zone 46 to a right channel zone 48.

Since the lens array is periodic, second-type transitions are formed halfway between the first-type transitions, coincident with the borders between adjacent cylindrical lenses of the lens array 18. The fact that a beam, such as the beam 42, passes through a right channel zone 46 does not necessarily mean that this beam is actually visible, but it only means that this beam comes closer to the right eye than to the left eye of the user. The same can be said of the right channel zone in relation to the right eye 34.

As is further shown in FIG. 3, the channel mask 44 can be projected into the object plane o, with the position U as the projection centre. This results in a projected channel mask 50 with projected right channel zones or right channel segments 52 and projected left channel zones or left channel segments 54. When a pixel in the object plane o and hence in the TFT layer 22 of the screen falls within a left channel segment 52, it is associated with or correlated with the left channel, and when it falls within the right channel segment 54 it is associated with or correlated to the right channel. Thus, it can be determined for each pixel on the screen to which channel it belongs, i.e. by which eye it will be seen or would be seen if it could be seen at all.

The distance from the user to the screen is considered to be optimal when the invisibility zones at the first-type transitions and the invisibility zones at the second-type transitions have equal widths. When the user retreats further from the screen, the first-type invisibility zones will shrink and will eventually vanish, at the very moment when the divergent beam 40 hits both eyes 32, 34 of the user. Conversely, when the user approaches the screen, the second-type invisibility zones (as symbolised by the beam 42) will shrink and eventually vanish. When one type of invisibility zones vanishes, the left and right channels are no longer completely separated, i.e. some pixels or parts thereof are visible with both eyes.

When the user moves to the left or right in FIG. 3, the projected channel mask 50 will shift in the opposite direction, but this can be compensated for by shifting the image displayed on the screen by the same amount. If no head or eye tracking system is present, the image will of course preferably be displayed in such a position that it can optimally be viewed by a user that is located right in front of the centre of screen.

As can further be seen in FIG. 3, the projected channel mask 50 is enlarged in comparison to the channel mask 44. However, this enlargement is due only to the projection, i.e. the divergence of the rays 30 and is not related to the enlarging properties of the individual cylindrical lenses.

Figure 4:
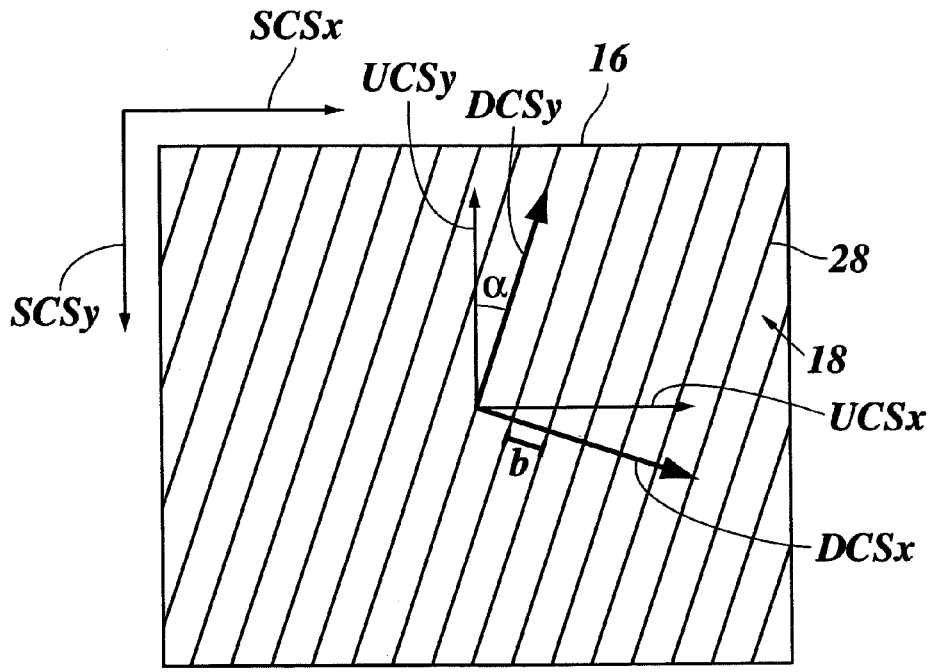
FIG. 4 is a front view of a screen and a lens array.

As is shown in FIG. 4, the cylindrical lenses 28 of the lens array 18 are not arranged strictly vertical, but form a certain angle α with the vertical pixel columns of the screen. The method according to the invention can deal with any desired angle α. A preferred choice for the angle α is arc tan(⅓)≅18, 43°.

FIG. 4 further shows three different coordinate systems: a screen coordinate system (SCS) with the axes SCSx and SCSy, having its origin in the top left corner of the screen 16, a display coordinate system (DCS) with the axes DCSx, DCSy and its origin in the centre of the screen, and a user coordinate system (UCS) with the axes UCSx, UCSy and its origin also in the centre of the screen. The display and user coordinate systems DCS and UCS are three-dimensional coordinate systems having a z-axis normal to the plane of the drawing in FIG. 4. Their origin is located in the principal plane p.

Figure 5:
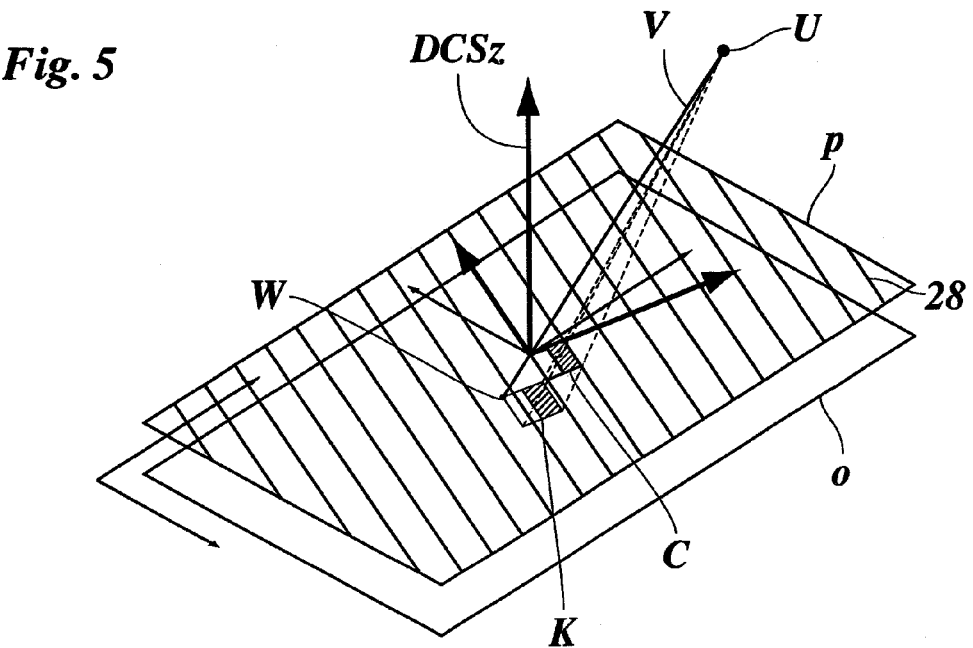
FIG. 5 illustrates various coordinate systems associated with the lens array and the screen, as well as a projection of a channel mask from the lens array onto the screen.

FIG. 5 is a perspective view of the principal plane p and the object plane o and shows also the z-axis DCSz of the display coordinate system. Further, this figure shows a position vector V pointing from the origin of the UCS to the position of the user, i.e. the point U in FIG. 3. The channel mask is symbolised here by a square C, and the projected channel mask is symbolised by a square K in the object plane o. It will be seen that the sides of the squares C and K are parallel to the longitudinal direction of the cylindrical lenses 28 and hence to the axis DCSy. A vector W in FIG. 5 is the projection of the vector V onto the object plane o.

The natural length unit for the screen coordinate system SCS will be pixel, and the length unit in the user coordinate system USCs will be a metric unit such as mm. In the display coordinate system DCS, however, the length unit is a unit b which is defined as the width of an individual lens 28 of the lens array 18.

Once the channel mask has been projected onto the object plane o, with the point U as the projection centre, it is possible to determine for each pixel on the screen to which channel it belongs. It shall first be assumed for simplicity that the screen is a black and white screen with square pixels that may assume any grey scale between black (0) and white (255). If the pixel lies completely, i.e. with all four corners, in one of the left channel segments 52, then the pixel will be associated with the left channel, i.e. it has a correlation 1 with the left channel. Conversely, when a pixel falls completely within one of the right channel segments 54, then the pixel will have a correlation 1 with the right channel (and consequently a correlation 0 with the left channel).

Figure 6:
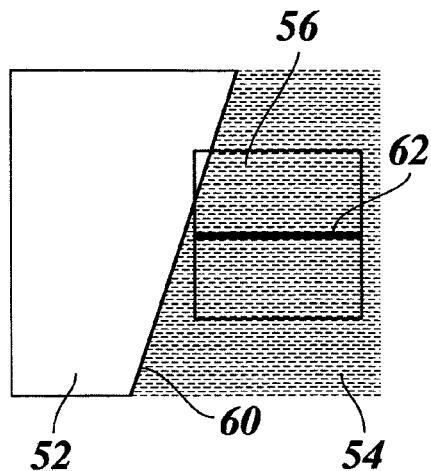
FIGS. 6 and 7 are diagrams illustrating different correlations of a pixel with different channels defined by the projected channel mask.
Figure 7:
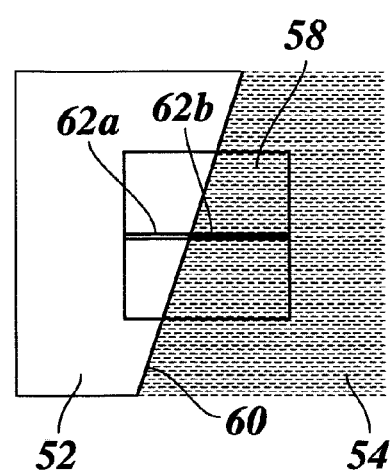

FIGS. 6 and 7 illustrate cases where a pixel 56 or 58 overlaps with the borderline 60 between a left channel segment 52 and a right channel segment 54. This can be tested in a straightforward manner, for example by checking the position of each of the four corners of the pixel relative to the borderline 60, or by determining the distance of the centre of the pixel from the borderline. When, for example, the projection that carries the square C to the square K in FIG. 5 is applied to the display coordinate system DCS, one obtains a new coordinate system with x and y axes in the object plane o and with the lens width b multiplied by the enlargement factor $(V_z+a)/V_z$ ($V_z$=z-component of Vector V in FIG. 5) as a length unit. Then, in this coordinate system, the borderlines 60 at the first-type channel transitions will fulfil the condition that the x-coordinate is an integer, and the borderlines belonging to the second-type transitions will fulfil the condition that the x-coordinate is an integer plus ½. Then, when the coordinates of the pixels are expressed in that coordinate system, the distance of the centre of the pixel from a borderline of any of the two types can easily be determined. Of course, this procedure may be inverted by projecting the pixel into the principal plane p and then expressing its position in the display coordinate system.

In a preferred embodiment, the pixels are correlated with the channels by inspecting a horizontal line interval 62 that has the width of the pixel and passes through the centre thereof. In the example shown in FIG. 6, the pixel 56 lies almost completely within the segment 54 and scratches the segment 52 only slightly, so that the line interval 62 is still fully contained in the segment 54. It will therefore be decided that the pixel 56 has the correlation 1 with the right channel.

In the more general case shown in FIG. 7, the borderline 60 divides the line interval into two sections 62a and 62b, and the correlation of the pixel 58 with each channel is given by the length of the corresponding section 62a or 62b divided by the total length of the line interval 62. As an alternative, the correlation of the pixel 58 with the right channel, for example, could be given by the area of the part of the pixel that overlaps with the right channel segment 54, divided by the total area of the pixel.

Once, the correlation of a pixel with the two channels has been determined, the task is to fetch the pertinent image information from the texture map L and/or R shown in FIG. 1. To this end, however, it is not sufficient to map the texture map or a suitable portion thereof onto the principal plane p and then project it onto the object plane o, because the optical effects of the lens array 18 have to be taken into consideration.

Figure 8:
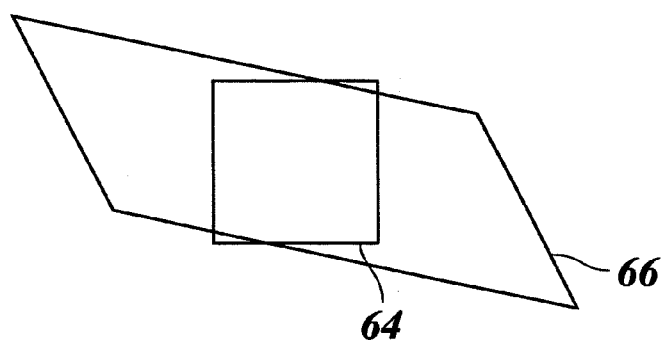
FIG. 8 illustrates a coordinate transformation applied to a pixel for modelling the enlargement effect of the lens array.

One effect of the lens array 18 is that each pixel, when viewed by the user, appears to be enlarged in the direction of the axis DCSx. The enlargement factor is determined by the cylindrical curvature of the lens. By way of example, it shall be assumed here that the enlargement factor is 3. Further, it shall be assumed as a representative example that the pixel in consideration fully belongs to the right channel. Then, the image information that the user perceives from the pixel in consideration must correspond to an area in the texture map R that has been enlarged by the same factor, i.e. by 3. Moreover, the pixel will be enlarged or stretched in the direction of the axis DCSx which is not parallel with the sides of the pixel. Thus, as is shown in FIG. 8, the area in the texture map R that corresponds to the area of a pixel 64 has the shape of a rhomboid 66, that is obtained by rotating the pixel 64 by the angle α, stretching it by a factor 3 in x-direction and then rotating it back by the angle −α. This transformation will be the same for any pixel on the screen 16, and consequently the corresponding calculations need to be performed only once.

As is illustrated by the beams 36-42 in FIG. 3, the lens array 18 has the further effect that the positions of the pixels in the object plane o are shifted (unless the midpoint of pixel is located on one of the rays 30). This effect has been illustrated in FIG. 9. A beam 68 diverging from the pixel 64 is condensed and deflected by the lens array 18 (at the principal plane p), and this gives rise to an enlarged and displaced virtual image 64' of the pixel. The distance Δ is the offset of the pixel 64 (the centre thereof) from the borderline 60 at which no displacement of the pixel would occur. This offset has already been calculated in conjunction with determining the channel to which the pixel 64 belongs. The magnification property of the lens magnifies this offset by a factor β(=3), so that the distance N by which the pixel appears to be displaced is given by N=Δ(β−1).

Consequently, the procedure for fetching the image information related to the pixel 64 from the texture map R comprises the steps of:

identifying the position in the texture map R (given in an appropriate texture coordinate system) that corresponds to the position of the centre of the pixel 64, placing the rhomboid 66 in the texture map, such that its centre coincides with the identified position, and shifting the rhomboid 66 by the distance N in the direction parallel to the axis DCSx (the sign of this displacement depends upon the side of the borderline 60 on which the pixel 64 is located).

Figure 10:
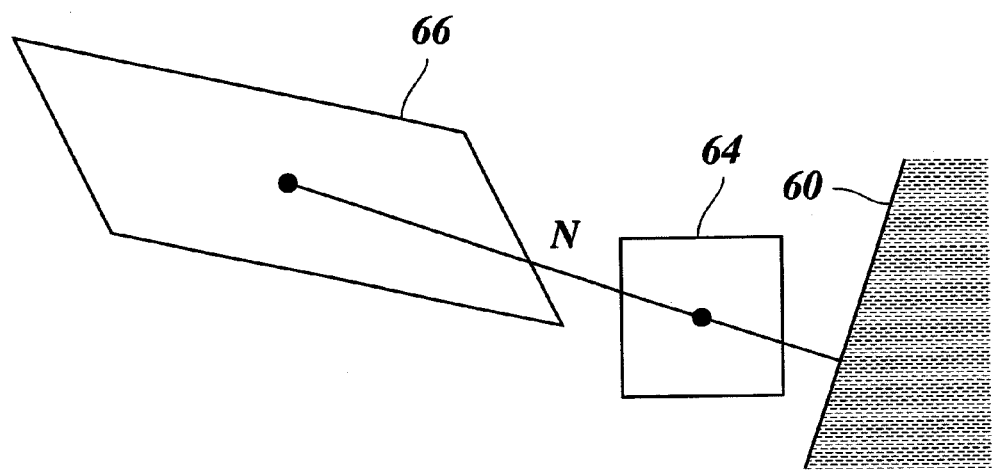
FIG. 10 is a diagram illustrating the combined deflection and enlargement effect.

This is illustrated in FIG. 10, where the pixel 64 and the borderline 60 have been mapped into the texture coordinate system. According to this figure, the pertinent area of the pixel would cover the area indicated by the square 64 in the texture map with β=1, while the rhomboid 66 reflects the position of the area pertinent to the pixel under e.g. β=3.

The image of the borderline in the texture map is not influenced by the value of "beta".

Then, ideally, the image information (grey level) to be displayed in the pixel 64 on the screen 16 would be obtained by averaging the image information contained in the rhomboid 66 in FIG. 10. In practice, however, this averaging operation will not be precise, because the texture map R will also have a limited resolution. Therefore, suitable sampling or filtering techniques such as bilinear or trilinear filtering may be applied to determine the contents of the pixel with more accuracy.

When a pixel is correlated with both texture maps L and R, then the content displayed in that pixel is determined by blending the contents of the corresponding areas of both texture maps L and R in proportion to the respective correlations. This means that when the image in one specific channel is considered, the contents of the pixels might not be quite correct, because they are also influenced by the contents of the "wrong" channel. It should be noted that this applies only to pixels that are located on one of the first-type borderlines 60 or one of the second-type borderlines, i.e. to pixels that are normally invisible. These pixels will become visible only when the user makes a relatively large lateral move or moves too close to the screen or too far away from a screen. In such cases the transition will be smoothened, and the visible defect caused by blending the contents of these pixels will be less disturbing than the effect that would be seen if the pixel had been fully assigned to one of the two channels. This will increase the performance and robustness of the system, in particular in cases where the lens array 18 is relatively fine, i.e. the lens width b is relatively small. A small lens width b has the advantage that, for a given optimal viewing distance, the object distance a will also become small, so that the arrangement of the screen and the lens array can be made more compact.

Of course, it is possible to implement a modified embodiment in which each pixel, even on the borderlines, is fully assigned to either the left channel or the right channel, depending on which of the two correlations is larger.

Figure 11:
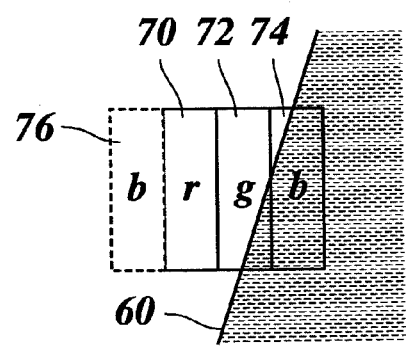
FIG. 11 is a diagram illustrating the channel correlations of a colour pixel.

When the screen 16 is a standard colour screen, each pixel will be subdivided into three rectangular sub-pixels 70, 72, 74, as is shown in FIG. 11, and each of these sub-pixels will be formed by a TFT in one of the basic colours red, green and blue (rgb). The procedure for correlating such a colour pixel to the left and right channels is analogous to the procedure described in conjunction with FIGS. 6 and 7, but now this procedure is performed individually for each of the sub-pixels 70, 72 and 74. In the example shown in FIG. 11, the red sub-pixel 70 will thus be fully correlated with the left channel, the pixel 72 will mainly be correlated with the left channel, whereas the blue pixel 74 will mainly be correlated with the right channel. When the pixel as a whole should be white, for example, when viewed in the right channel, this implies a certain colour defect, because the pixel will actually appear yellow, since the blue sub-pixel 74 will contribute only very little or may even remain invisible. However, since the borderline 60 is slanting, the colour defects will be different for different pixel lines, and the defects will essentially be averaged-out, so that no significant colour seam will be produced even when the borderline pixels become visible. As an additional counter-measure, the error caused by the "missing" blue pixel 74 may be diffused onto neighbouring pixels. For example, the intensity that should be assigned to the blue pixel 74 when it would fully belong to the right channel can be added to the intensity of the next adjacent blue pixel 76, so that the total colour impression of the triplet formed by the pixels 76, 70 and 72 is again white.

Although the sub-pixels are treated individually when they are correlated with the channels, the entire colour pixel consisting of three sub-pixels is treated as a unit when the image information is fetched from the texture map L or R, so that the pixel will give the correct colour impression.

It will be understood that the transformations between the various coordinate systems described above, as well as the transformations involved in the projection of the channel mask and the texture map onto the object plane o can be achieved through matrix multiplications. For example, a simple rotation matrix (for the angle α) may be used for conversions between the coordinate systems UCS and DCS. Some transformations, for example from and to the screen coordinate system SCS, involve also translations, because the origins of the coordinate systems do not coincide. It is therefore convenient to employ homogenised 4×4 matrices.

Such 4×4 matrices will also be used for projecting characteristic points of the channel mask into the object plane o, as was described in conjunction with FIGS. 3 and 5. The characteristic points of the channel mask may for example be the corner points of the square C in FIG. 5 or pairs of points on each of the borderlines 60. The magnification involved in the projection, as explained in conjunction with FIG. 3, will then be given by a matrix $$M = \begin{pmatrix} 1+[a/V_z] & 0 & 0 & 0 \\ 0 & 1+[a/V_z] & 0 & 0 \\ 0 & 0 & 1 & 0 \\ 0 & 0 & 0 & 1 \end{pmatrix}$$

wherein a is the object distance defined in FIG. 3 and $V_z$ is z coordinate of the vector V (FIG. 5).

The shift of the projected mask 50 relative to the channel mask 44 is given by a matrix:

$$S = \begin{pmatrix} 1 & 0 & 0 & 0 \\ 0 & 1 & 0 & 0 \\ 0 & 0 & 1 & 0 \\ W_x & W_y & W_z & 1 \end{pmatrix}$$

wherein $W_x=(a*V_x/V_z)$, $W_y=(a*V_y/V_z)$ and $W_z=a$ are the x, y and z components of the vector W ($V_x$ and $V_y$ being the x and z components of V).

Multiplication of any homogenised vector $A=(A_x, A_y, A_z, 1)$ with the matrix S has the effect of a displacement by the length and in the direction of the vector W, resulting in the vector $(A_x+W_x, A_y+W_y, A_z+W_z, 1)$.

The total projection of any characteristic point of the channel mask is then obtained by multiplying the coordinate vector of that point with the product of the matrices M and S.

The process of texturing screen space, that is, the process of fetching the pertinent image information for each pixel from the texture map L or R, is done in the following way:

For each pixel in screen space we need to know where the pertinent area in the texture map is located, that will be mapped onto this pixel. A texture, that commonly is understood as a "rectangular bitmap containing an image", has its own 2-dimensional Texture Coordinate System (TCS), where the upper left corner is identified as T1=(0,0), and the other corners, in clockwise order, are T2=(1,0), T3=(1,1) and T4=(0,1). The space of the TCS is also called the Texture Space.

We now identify the corners T1, T2, T3 and T4 of the two textures L and R with the four corner points of D1, D2, D3 and D4 of the screen 16. This means we imagine the textures and R to be located on the screen 16, in the very location where their mapped image is to be seen by the user.

Subdividing the texture map in accordance with the number of pixel lines and pixels rows of the screen gives directly the positions of the center of each pixel in the texture map in texture coordinates.

Figure 9:
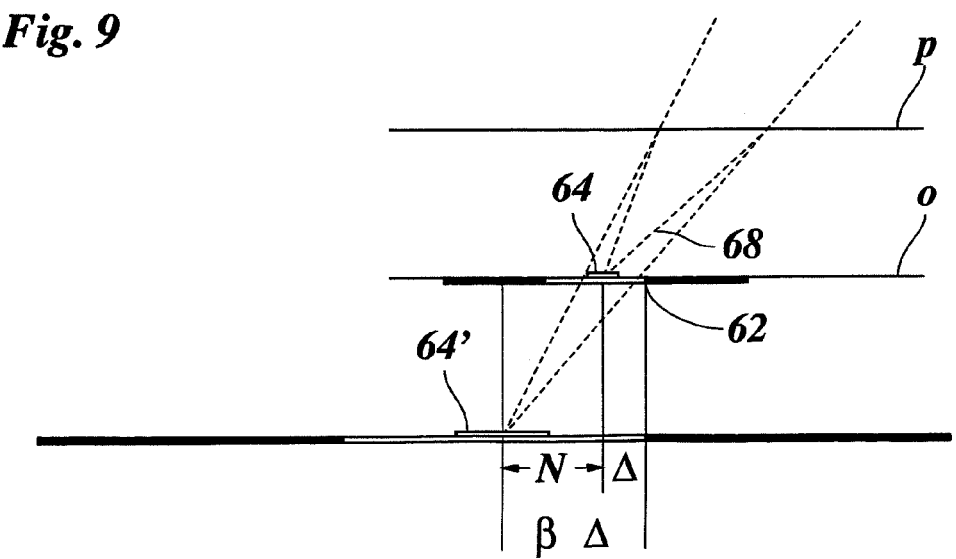
FIG. 9 is a diagram explaining a deflection effect of the lens array.

All that remains to do then is to place the rhomboids 66 with their corners on the corners of the desired pixels and to perform the displacement of the rhomboid in Texture space by the vector N as shown in FIGS. 9 and 10. For the texture fetch we simply identify the corners of the rhomboid in texture space with the corners of the pixel in screen space and map the pertinent portion of the texture ("sample footprint") onto the pixel according to our preferred sampling method.

The result is that, for each channel, the contents of all the pixels are such that what the user sees on the screen is the contents of the texture map imaged on the principal plane p in front of the screen. Even the pixels in the invisibility zones have the correct contents, so that the image will not be disturbed when the user moves slightly to the left or to the right, without the display on the screen being changed.

Figure 12:
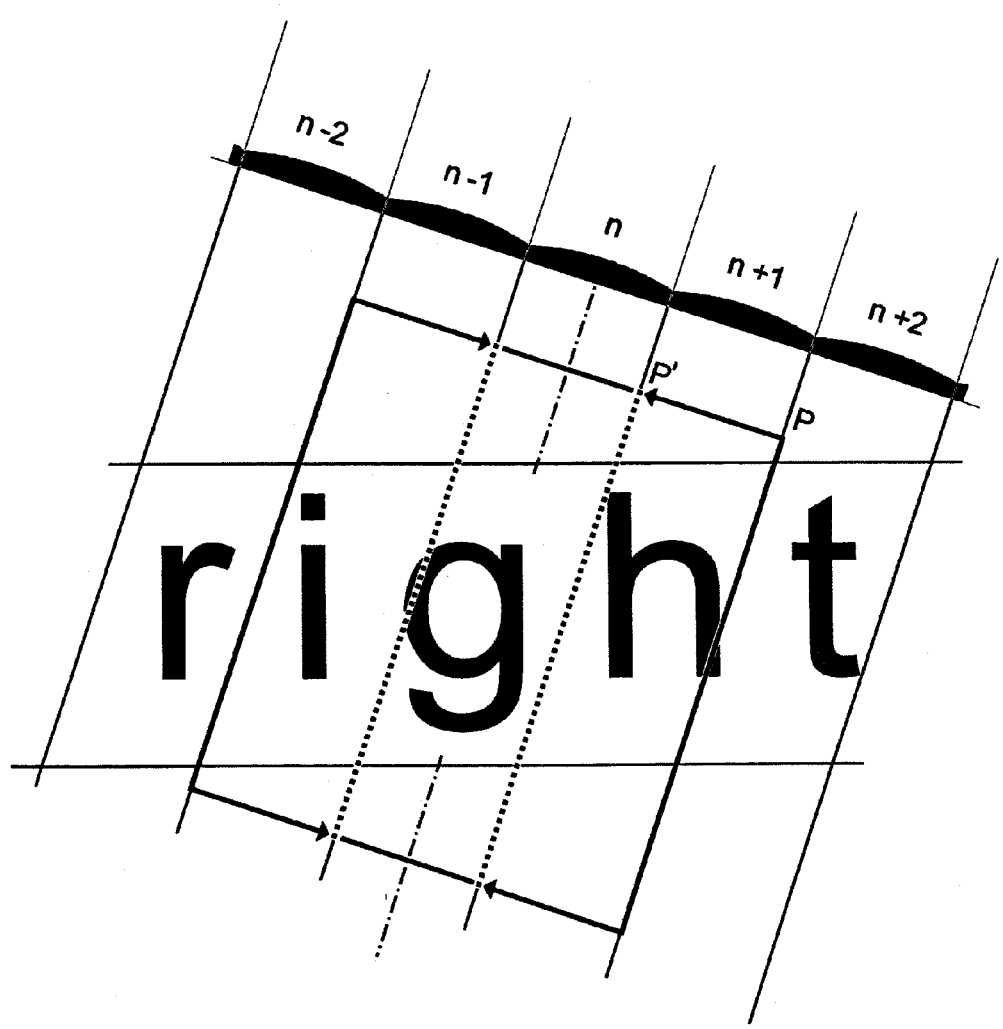
FIGS. 12 to 20 are diagrams illustrating the effects of the method according to the invention for a specific example.

By reference to FIGS. 12 to 22, the effects of the method according to the invention will now be explained in conjunction with a simple example for an image in the right channel. As is shown in FIG. 12, this image consists of the word "right" which extends over 5 adjacent cylindrical lenses and their corresponding segments n−2, n−2, n, n+1 and n+2. The central axis of the central lens n has been indicated as a chain line. A rectangle P indicates the area of the image that is affected by the lens n. The information contained in that rectangle shall be visible for the user through the lens n not only when he looks at the screen at right angles, but also when he looks at the screen from a laterally offset position. To that end, the information contained in the rectangle P must be transformed into a narrower rectangle P'.

Figure 13:
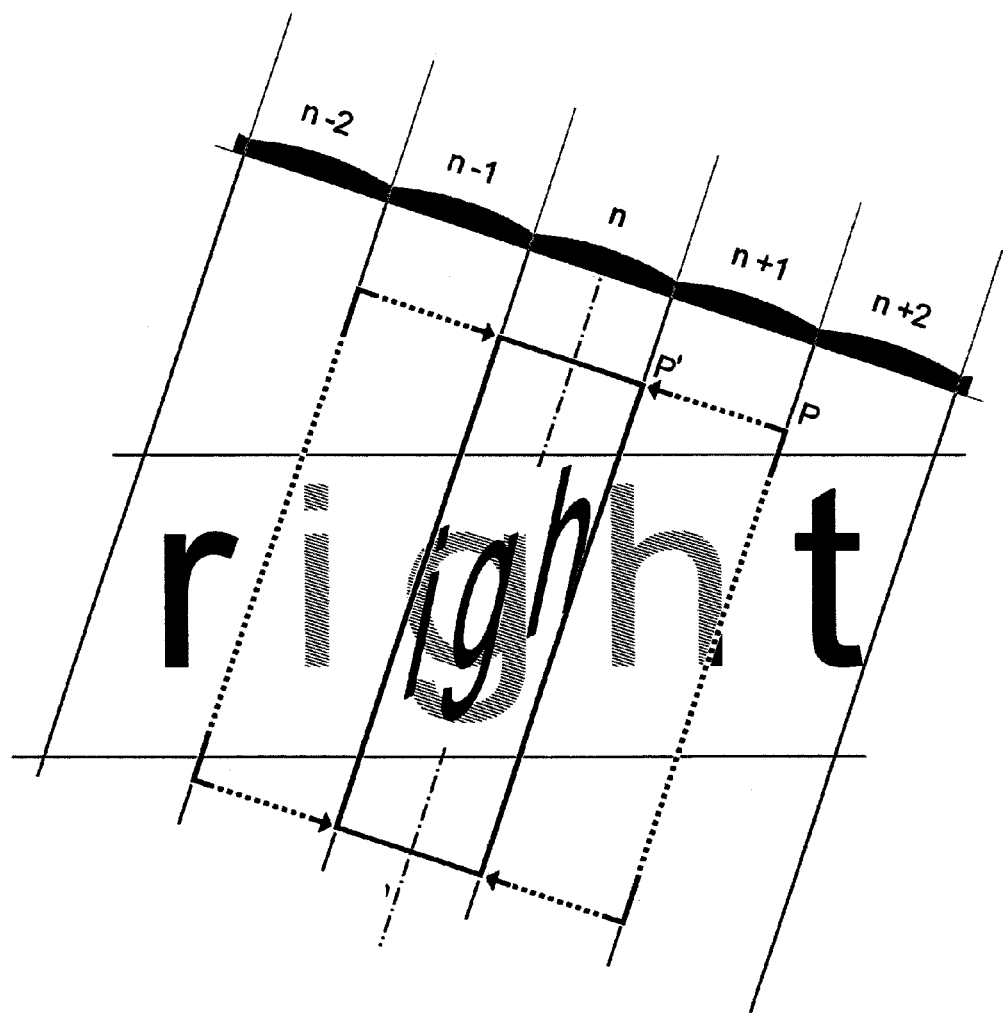

This has been shown in FIG. 13, where the original image in the rectangle P has been shown shaded, and the transformed image in the rectangle P' has been shown in black. This transformation is the result of fetching the image information for each pixel from the areas of the texture map R that have been transformed as shown in FIGS. 8 and 10. Once the necessary parameters have been specified, these texturing operations are automatically carried out by the graphics card 12.

Figure 14:
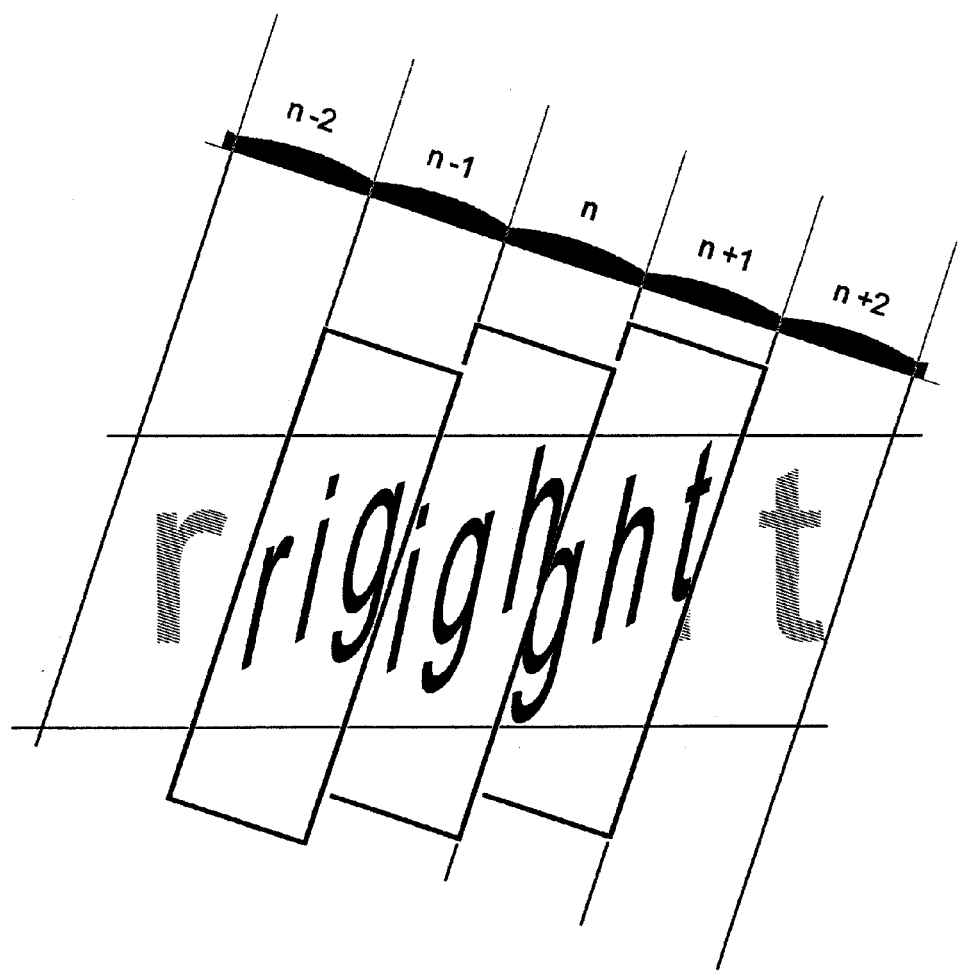

FIG. 14 shows corresponding transformations of the images associated with the segments n−1 and n+1.

Figure 15:
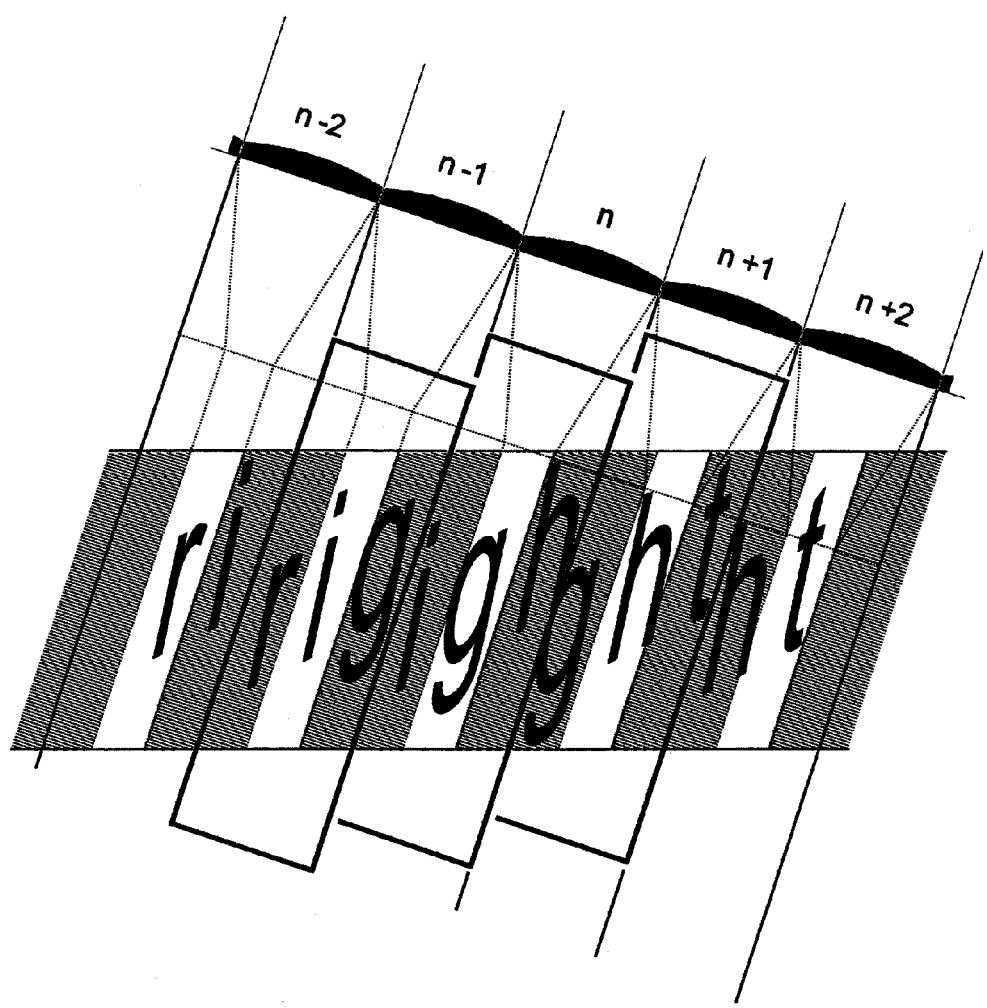

In FIG. 15, the zones that are actually visible for the user (in the optimal viewing position) are shown on a white background, whereas the invisibility zones are shown with a shaded background.

Figure 16:
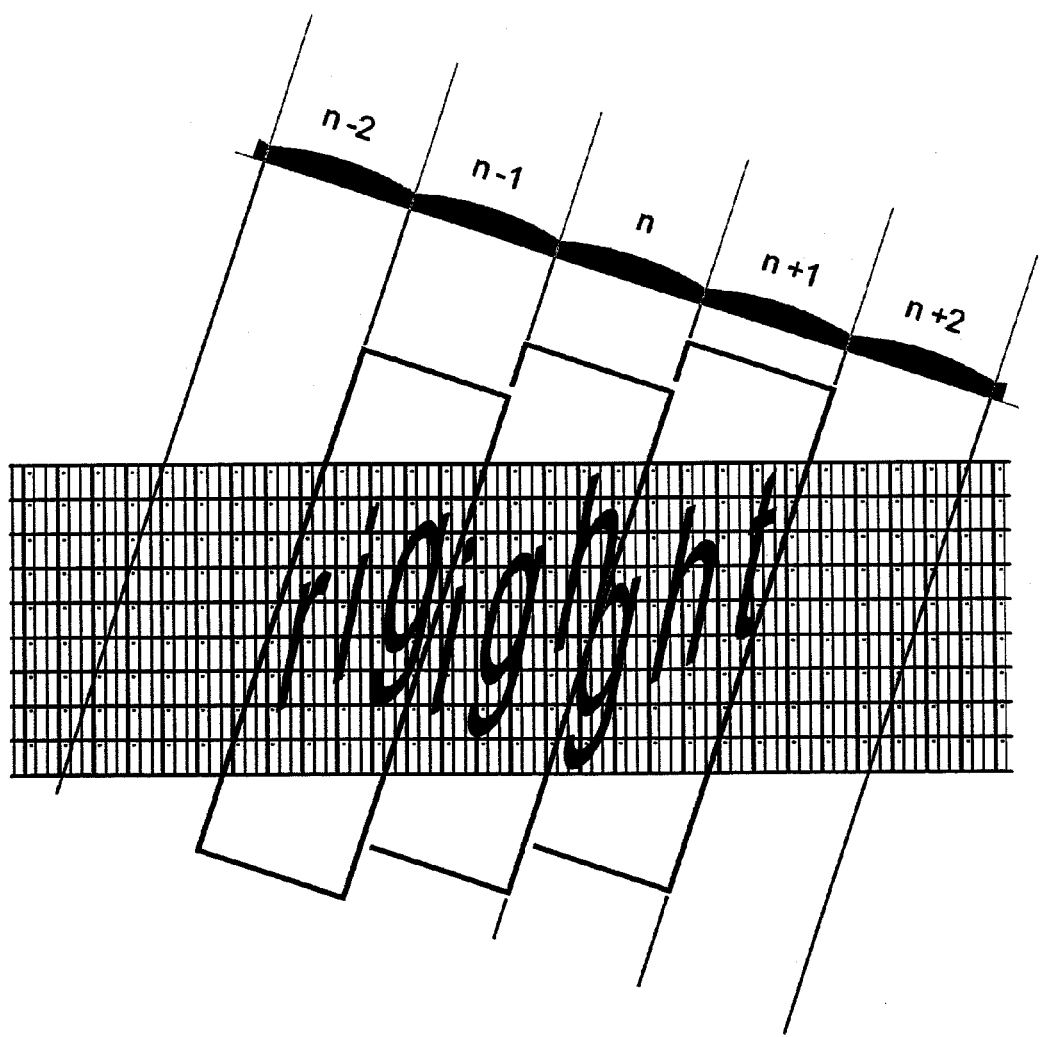

FIG. 16 additionally shows the pixel or rather sub-pixel structure of the screen 16. The red sub-pixels of each pixel have been marked by a dot.

Figure 17:
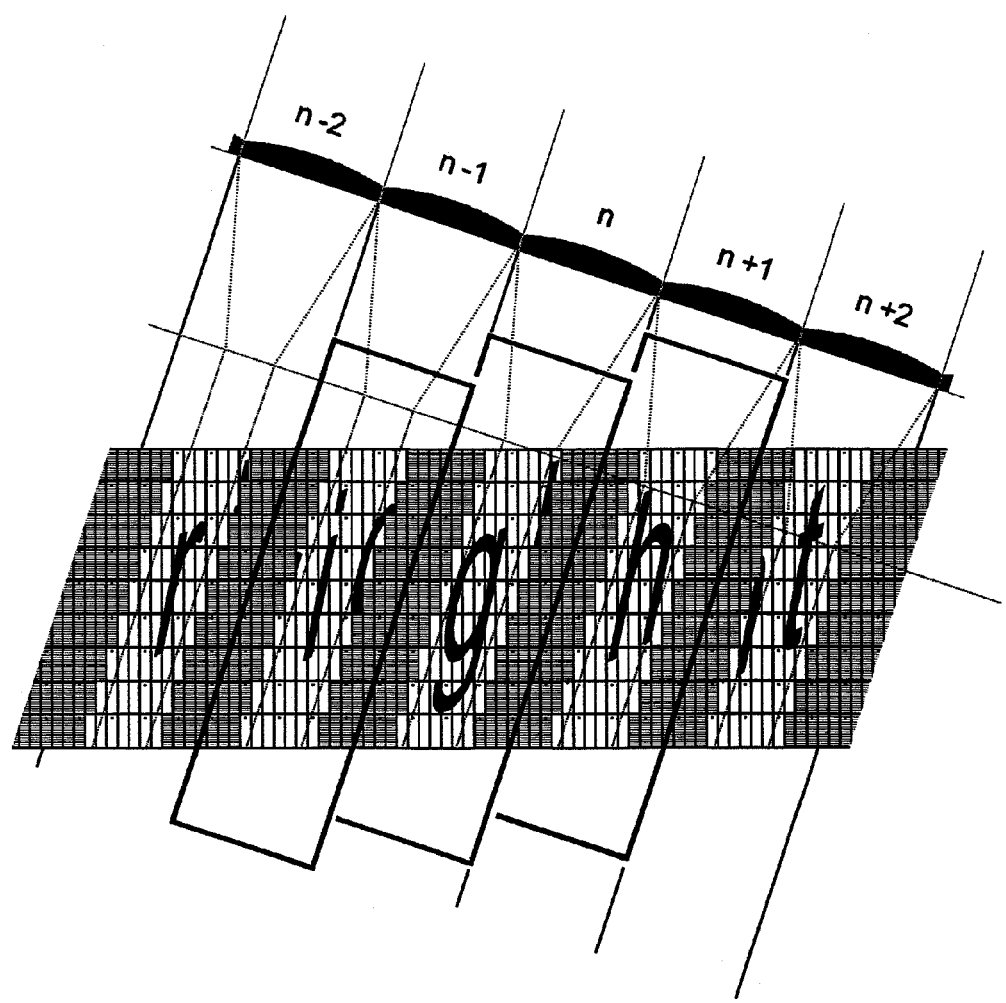
Figure 18:
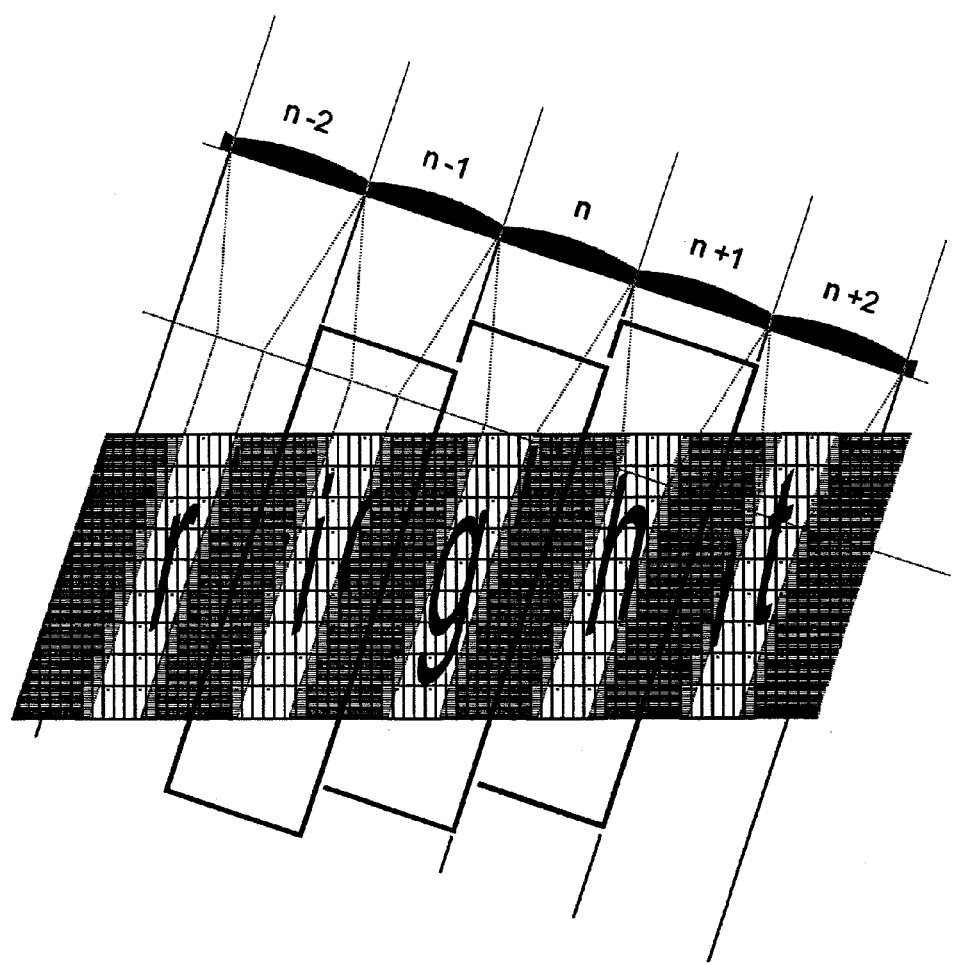

FIG. 17 shows the pixel structure together with the zones that are visible in the right channel (white background). The shaded pixels in FIG. 17 comprise the invisibility zones as well as the segments that are reserved for the left channel and are also invisible for the right eye. In FIG. 18, the pixels correlated with the left channel have been shown with a dark shading, whereas the pixels that belong to the right channel but are located in the invisibility zones are shown with a light shading. It can be seen that these invisible pixels nevertheless bear image information of the right channel, with the result that the information is somewhat redundant. For example, the right leg of the letter "h" is visible in the central zone of the segment n+1 and is again represented in the invisibility zone of the segment n+2.

Figure 19:
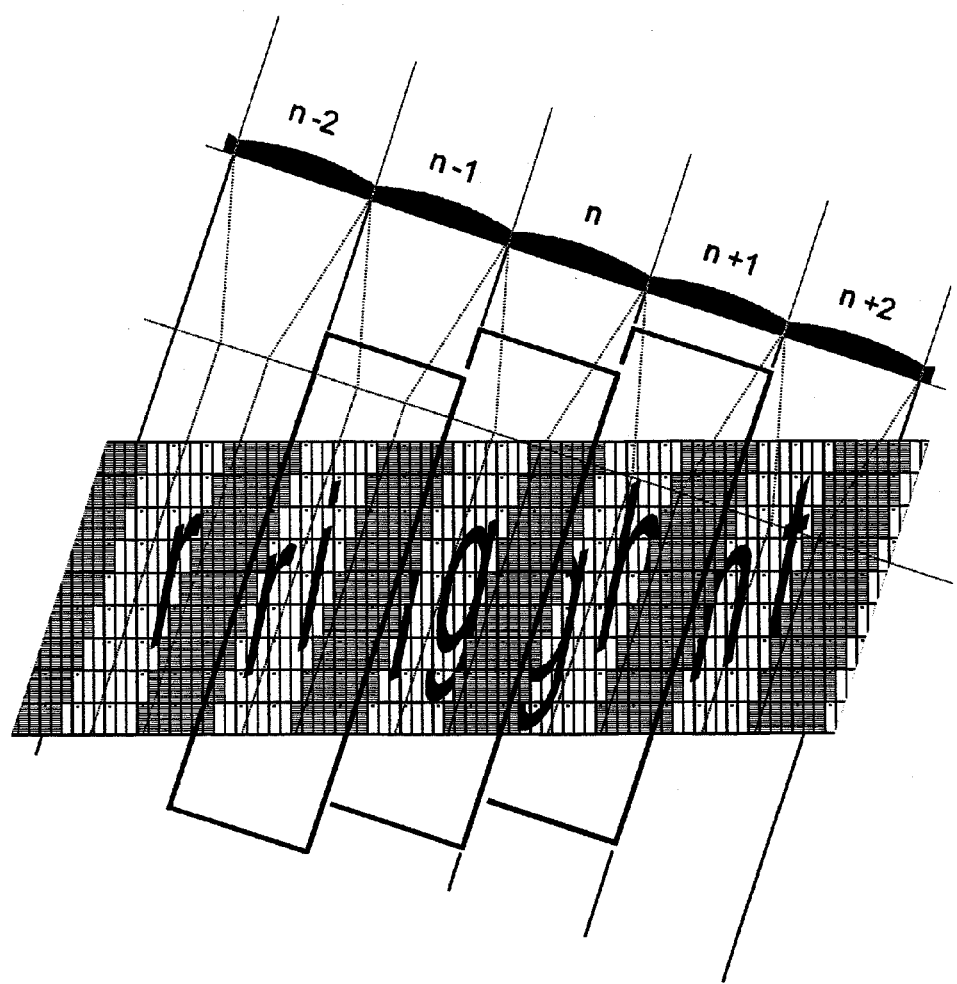

FIG. 19 illustrates a situation where the user has moved his head, with the result that the visible zones are now offset from the centre of the respective segments. The head tracking system has detected this movement of the user and has adapted the correlation of the pixels with the left and right channels in accordance therewith. The result is a shift of the segment borders and, consequently, a change of the contents of the pixels in the invisibility zones near these boarders. In this way, the system keeps up with the movement of the user by "scrolling" the image information across the segments, as has been described in U.S. Pat. No. 6,302,541.

Figure 20:
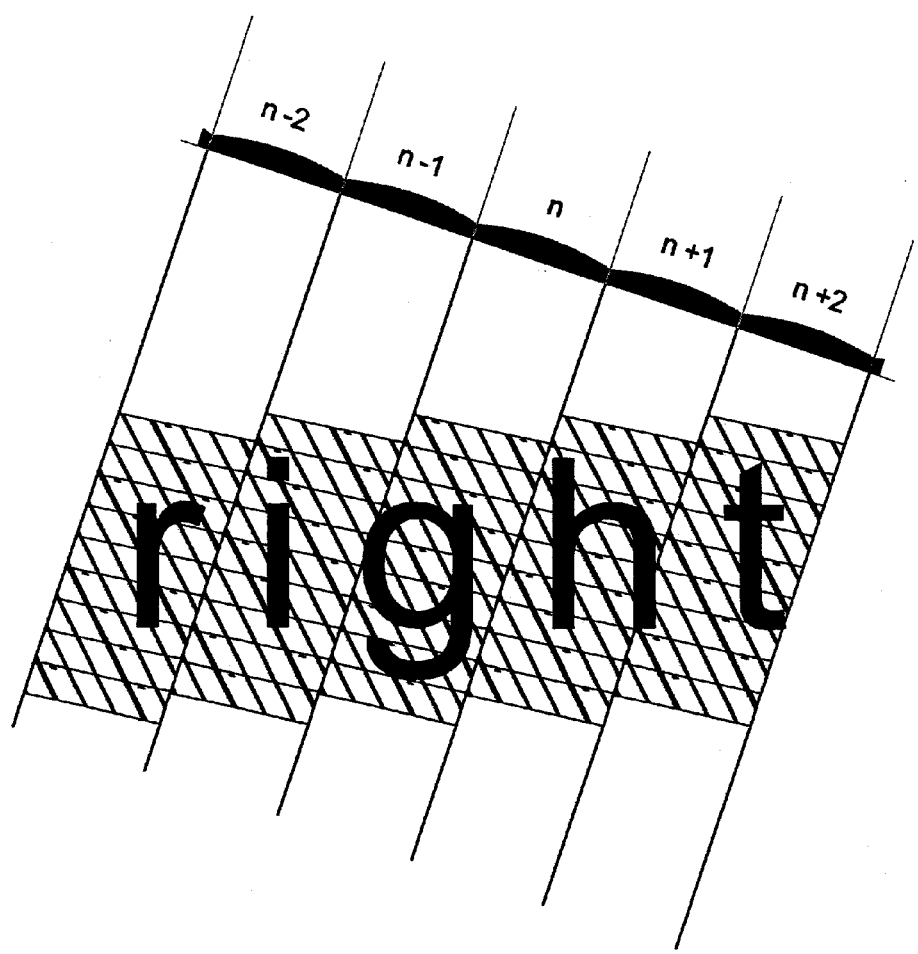

Finally, FIG. 20 shows the optical effect of the lens array 18 which reverses the transformations shown in FIGS. 13 to 18 and composes the full image visible with the right eye of the user in its original shape, whereas the sub-pixel structure of the screen is now enlarged and distorted.

What is claimed is:

1. A method for the autostereoscopic representation of images on a screen, wherein image information of separate channels for a right eye and a left eye of a user is displayed in interleaved segments on the screen, and a lens array is disposed for deflecting light emitted from the screen such that the image information of each channel is visible only for one eye of the user, comprising the steps of:
   defining a channel mask, as determined by the lens array, in a display coordinate system that has a fixed relationship to the lens array,
   dividing a principal plane of the lens array into left channel zones and right channel zones with said channel mask,
   subjecting the channel mask to a coordinate transformation that corresponds to a central projection of the channel mask from the principal plane of the lens array onto an object plane of the screen, with a position of the user as projection center, thereby to assign to each pixel of the screen a correlation with at least one of the channels, in accordance with the position of the user,
   storing, for each channel, a texture map containing the image information of that channel,
   performing a coordinate transformation that associates each pixel of the screen with an area in at least one of the texture maps, said transformation representing the deflection of light from the pixel by the lens array, and
   determining the contents of each pixel on the basis of its correlations with the texture maps and the contents of the associated area of the at least one of the texture maps.

2. The method according to claim 1, wherein the lens array is disposed on the screen in a position in which longitudinal directions of cylindrical lenses of the lens array are inclined at an angle relative to a vertical axis of the screen, and the coordinate transformation associating each pixel with an area in one of the texture maps includes a rotation about the angle of inclination of the lens array and an affine linear transformation including a stretching by an enlargement factor of the lens array and corresponding to an enlargement effect of the cylindrical lenses in the direction normal to the longitudinal axes of these lenses.

3. The method according to claim 1, wherein a change in the position of the user is detected and tracked, and the coordinate transformation corresponding to the projection of the channel mask is changed dynamically in accordance with the changed position of the user.

4. The method according to claim 3,
   wherein the step of assigning to each pixel a correlation with at least one of the channels includes a step of identifying pixels on a borderline between two segments and assigning to these pixels a correlation with each of the two channels, and
   wherein the step of determining the contents of each pixel, when applied to these pixels, includes a step of blending the contents from both texture maps in accordance with the correlations assigned to the pixel.

5. The method according to claim 1, wherein the coordinate transformations are performed by multiplication of homogenized matrices.

6. The method according to claim 1, wherein the step of determining the contents of each pixel includes a texturing procedure mapping an area of the texture map onto a segment on the screen.

7. The method according to claim 1,
wherein the step of assigning to each pixel a correlation with at least one of the channels includes a step of identifying a pixel on a borderline between two segments and assigning to this pixel a correlation with each of the two channels, and
wherein the step of determining the contents of each pixel, when applied to this pixel, includes a step of blending the contents from both texture maps in accordance with the correlations assigned to the pixel.

8. The method according to claim 7, wherein the step of blending the contents from both texture maps comprises blending the contents of the associated areas of both texture maps in proportion to the respective correlations assigned to the pixel.

9. The method according to claim 1, for representing colour images on a screen the pixel of which are composed of sub-pixels in different colours, wherein the step of assigning a correlation with at least one of the channels is performed individually for each sub-pixel.

10. A system for the autostereoscopic representation of images according to claim 1, comprising:
a monitor with a screen,
a lens array disposed in front of the screen and
a computer system adapted to carry out the method according to claim 1.

11. A software product for the autostereoscopic representation of images according to the method of claim 1, comprising program code that is stored on a computer-readable medium and, when run on a computer connected to a monitor equipped with a lens array, causes the computer to perform the method according to claim 1.

12. The method according to claim 1, wherein in the step of subjecting the channel mask to a coordinate transformation, the coordinate transformation corresponds to a central projection of the channel mask from a principal plane of the lens array onto an object plane of the screen, with a position of the user as projection center, wherein the projected channel mask is enlarged in comparison to the channel mask, thereby to assign to each pixel of the screen a correlation with at least one of the channels in accordance with the position of the user.

13. The method according to claim 12,
wherein in the step of subjecting the channel mask to a coordinate transformation corresponding to the projection of the channel mask, the interleaved segments correspond to projected right channel zones and projected left channel zones of the projection of the channel mask, and
wherein a change in the position of the user is detected and tracked, and the coordinate transformation corresponding to the projection of the channel mask is changed dynamically in accordance with the changed position of the user.

14. The method according to claim 1, wherein in the step of subjecting the channel mask to a coordinate transformation corresponding to the projection of the channel mask, the interleaved segments correspond to projected right channel zones and projected left channel zones of the projection of the channel mask.

15. The method according to claim 14,
wherein the step of assigning to each pixel a correlation with at least one of the channels includes a step of identifying pixels on a borderline between two segments and assigning to these pixels a correlation with each of the two channels, and
wherein the step of determining the contents of each pixel, when applied to these pixels, includes a step of blending the contents from both texture maps in accordance with the correlations assigned to the pixel.

16. The method according to claim 1, wherein the coordinate transformation that associates each pixel of the screen with an area in at least one of the texture maps includes a stretching by an enlargement factor, which corresponds to an enlargement effect of the lens array.

17. A method for the autostereoscopic representation of images on a screen, wherein image information of separate channels for a right eye and a left eye of a user is displayed in interleaved segments on the screen, and a lens array is disposed for deflecting light emitted from the screen such that the image information of each channel is visible only for one eye of the user, comprising the steps of:
defining a channel mask, as determined by the lens array, in a display coordinate system that has a fixed relationship to the lens array,
subjecting the channel mask to a coordinate transformation that corresponds to a projection of the channel mask from a principal plane of the lens array onto an object plane of the screen, with a position of the user as projection center, thereby to assign to each pixel of the screen a correlation with at least one of the channels,
storing, for each channel, a texture map containing the image information of that channel,
performing a coordinate transformation that associates each pixel of the screen with an area in at least one of the texture maps, said transformation representing the deflection of light from the pixel by the lens array, and
determining the contents of each pixel on the basis of its correlations with the texture maps and the contents of the associated area of these texture maps,
wherein a change in the position of the user is detected and tracked, and the coordinate transformation corresponding to the projection of the channel mask is changed dynamically in accordance with the changed position of the user, and
wherein the coordinate transformations are performed by multiplication of homogenised matrices and the coordinate transformation corresponding to a projection of the channel mask is defined by a matrix that is the product of a constant matrix and a variable matrix that reflects the effects of the changes in the position of the user.

18. The method according to claim 3, wherein in the step of subjecting the channel mask to a coordinate transformation corresponding to the projection of the channel mask, the interleaved segments correspond to projected right channel zones and projected left channel zones of the projection of the channel mask.

* * * * *